3,514,695
PORTABLE CURRENT INTENSITY DETECTOR
FOR AERIAL BOOMS
Paul E. Skarshaug, 4607 Dover Drive,
Ames, Iowa 50010
Filed May 23, 1968, Ser. No. 731,458
Int. Cl. G01r 31/02, 31/12
U.S. Cl. 324—54                             11 Claims

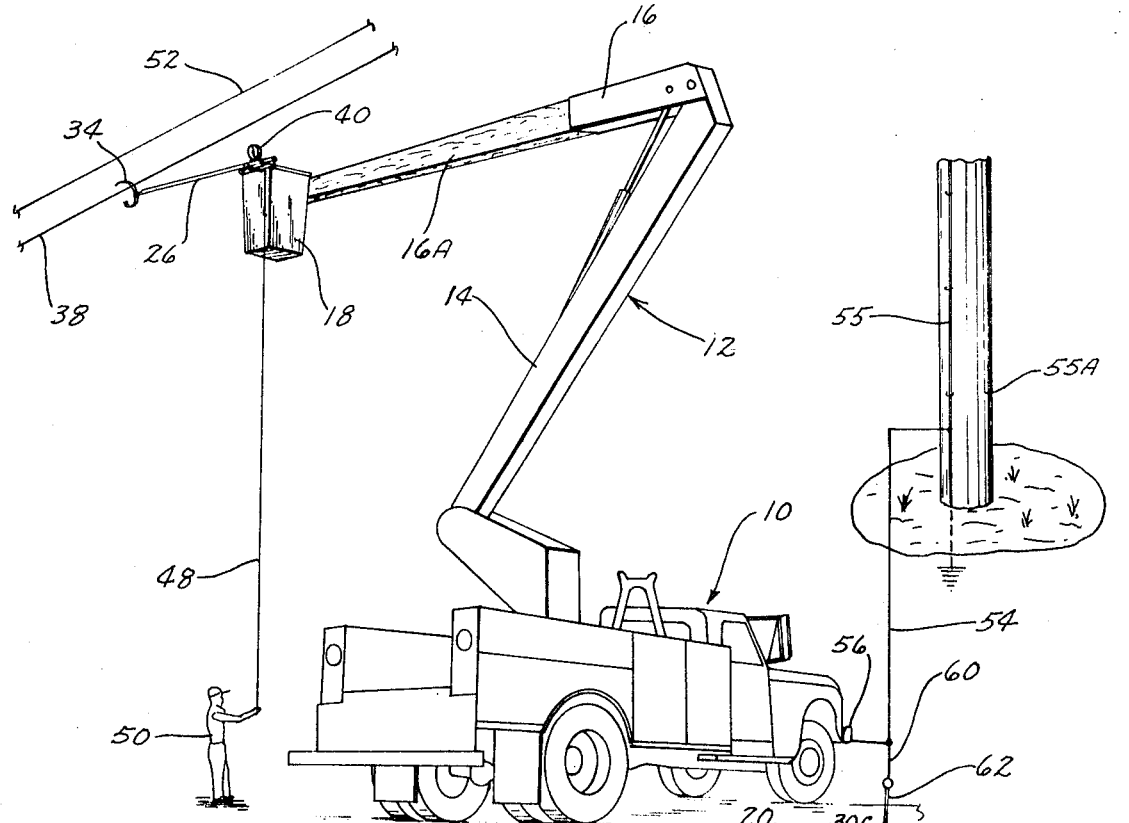
*Fig. 1*
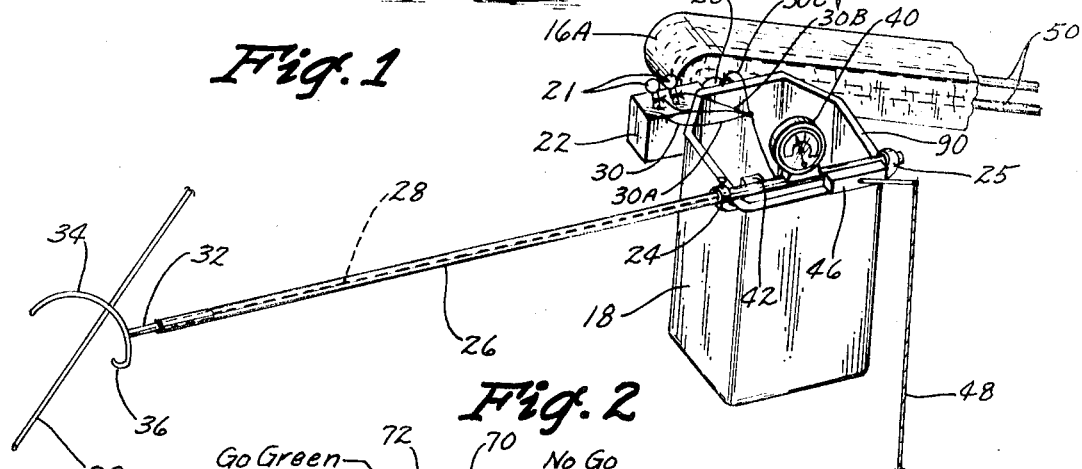
*Fig. 2*
*Fig. 3*
INVENTOR
PAUL E. SKARSHAUG
BY
Zarley, McKee & Thomte
ATTORNEYS United States Patent Office 3,514,695
Patented May 26, 1970

ABSTRACT OF THE DISCLOSURE

A boom structure to be operated in the vicinity of high voltage power lines including a current intensity detector for indicating through a meter visible from the ground the extent the insulated workman's bucket and the top end of the boom are insulated from the truck whereby it can be determined if it is safe to allow workmen in the insulated bucket and if not provide a warning for taking corrective action to make the unit safe from electrical shock and stray currents when the bucket or outer boom end comes in contact with a high voltage power line.

There is a common problem with all truck equipment having a boom for carrying a man-size bucket on the end thereof when the bucket is positioned in the proximity of high power voltage lines. The bucket and outer boom end are intended to be insulated from the truck and thus protect the workman from harm in the bucket when and if the bucket or outer boom end contact the high voltage power line. However, should there inadvertently be an electrical conduction of any nature connecting the bucket and outer boom end to the metal boom structure and the bucket or the fiberglass outer boom end then touch the high voltage power line, the workman could be seriously injured or killed from electrical shock or stray currents.

The object of this invention is to provide testing equipment to be used on the boom in conjunction with the bucket to determine the degree of electrical conduction to which a workman will be subject while working in the bucket.

Prior to a workman going up in the bucket it is intended that the boom will be manually operated from the truck to position the bucket adjacent the high voltage power lines such that a voltage intensity probe will engage one of the high voltage power lines. The probe is then connected to a meter having red and green "no go" and "go" indicia. The probe is connected to a wire extending across the center of the bucket and terminating in a plurality of electrical clips to be connected to anything which might be conductive in the end of the fiberglass boom such that if there is a short in the fiberglass boom or stray currents in the bucket the meter hand will move to the "no go" red position and if it is safe then the meter will register on the "go" green position. Common foreign conductors in the fiberglass boom that the detector finds are: (1) contaminated hydraulic oil; (2) hydraulic conductive hoses; (3) dust and grease which is conductive; (4) leveling rods that are conductive; and (5) foreign conductive elements in the fiberglass material.

A protection device is provided for the meter in the form of a shunting circuit bypassing the meter. The switch in the shunting circuit may be operated by an insulated cord extending to the ground and thus when a test is to be conducted the cord is operated to open the switch and allow a circuit to be made through the meter. A fuse is placed in the probe circuit to protect the meter against the excessive currents.

The best possible ground is provided for the circuit and may either be a wire extending from the truck body carrying the boom to the neutral or ground wire of the high voltage lines on an adjacent pole or a ground wire engaging the ground.

The probe element has a concave (arcuate or V-shaped) outwardly facing portion having a hooked end for positive mechanical engagement with the high voltage power line. It is thus seen that the insulation in the bucket and the fiber glass boom end is put to most severe tests and will cause the meter to register the presence of current flowing from the high voltage power line through the probe to the metal truck boom and back to the ground. If the meter does register in the "no go" red position, then corrective action may be taken to find the short between the bucket and the boom. The meter reads from 0 to 2000 microamps with 1000 microamps to 2000 being in the danger red position.

These and other features and advantages of this invention will become readily apparent to those skilled in the art upon reference to the following description when taken into consideration with the accompanying drawings, wherein:

FIG. 1 is a perspective view of a truck having an extendable boom and insulated bucket on the end thereof which in turn includes the current intensity probe system;

FIG. 2 is a fragmentary perspective view of the bucket on the end of the boom and the probe engaging a high voltage power line; and FIG. 3 is a schematic electrical diagram of the current intensity testing detector circuitry and also illustrating an alternate probe element.

The testing equipment of this invention is shown mounted on a truck 10 having a boom 12 including a pair of hinged together arms 14 and 16. A workman's insulated fiberglass bucket 18 is pivotally carried on a trunnion 20 at the outer end of a fiberglass outer end boom portion 16A of the boom arm 16.

The boom arms 14 and 16 may be operated from controls on the ground on the truck or by controls 21 carried on a box 22 on the bucket 18.

The detector system on the bucket 18 includes an Epoxiglass pole 26 which is six feet long and one and one-fourth inches in diameter detachably secured by a pair of brackets 24 and 25 to the top of the bucket 18. The pole 26 is hollow and includes an electrical wire 28 extending therethrough and which terminates in portions 30, 30A, 30B and 30C fastened to the metal control box 22, the valve control levers 21 and the trunnion 20. The other end of the electrical wire 28 is connected to the stub shaft 32 of an outwardly facing concave probe element 34 (FIGS. 1 and 2) having one end formed into the shape of a hook 36 for positive mechanical engagement with a high voltage power line 38. The electrical wire 28 is connected to a "go" and "no go" meter through a fuse 42 which will protect the meter should the electrical charge be too great.

A shunting circuit 44 is provided around the meter 40 and the fuse 42 and includes a switch 46 operable by a nylon one-eighth inch line 48 tested at 100 kv. per foot of length. The switch 46 is normally spring biased closed to protect the meter 40 and may be opened by the operator 50 standing on the ground by pulling on the cord 48.

The dash lines 50 in FIG. 3 indicate the conductive foreign elements that may have inadvertently electrically interconnected the bucket or the fiberglass boom portion 16A with the metal boom arm 16 thereby making a circuit with the ground through the bucket 18. The ground is preferably the neutral wire 52 of the power line which may be connected through a lead line 54 extending from a ground wire 55 on a pole 55A to the bumper or frame 56 of the truck 10. Optionally, a conductive wire 60 may be connected to the ground through a stake 62. The insulation in the fiberglass boom arm 16A and the bucket 18 must be put through the most severe tests and thus the best possible ground must be provided to insure that the circuit is not broken anywhere but at the point of connection between the fiberglass boom portion 16A to the metal portion 16.

The meter 40 on the bucket 18 is conspicuous and is readable from the ground by the operator 50. This is possible because it includes a "no go" red portion 70 and a "go" green portion 72. The "go" band extends from 0 to 1000 microamps and the "no go" band from 1000 to 2000. Thus, if the needle of the meter is moved to the right to a vertical position (1000) or further, it will be readily apparent that an unsafe amount of current is flowing through the meter which means there is a short in the fiberglass boom 16A or there are stray currents (galvanic currents) in the bucket 18. Closer inspection of the meter to give fine readings may be made from the ground by use of binoculars. The pole 26 has an outer clamp 25 for anchoring under the top flange 90 on the bucket and an inner slidable clamp 24 for adjustably engaging the flange 90 on the opposite side of the bucket. The pole may be positioned anywhere across the bucket to position the meter 40 in the working area and maintain the wire 26 in the area of stray currents. The probe 34A as seen in FIG. 3 is V-shaped and functions to give positive mechanical engagement with the power line 38.

Thus, it is seen through the use of this testing system that an accurate indication of the insulating integrity of the boom and all of the controls is provided and more importantly an exact indication is given as to the electrical conditions at their worst that may exist in the bucket where the workmen work.

In operation, the truck is moved to the vicinity of the power lines 38 and 52 and the bucket 18 on the boom 16 is moved to the position of FIG. 1 such that the conductive probe element 34 engages the high voltage line 38. The pole 26 on the bucket 18 may push the concave probe element 34 or 34A into or down onto the line 38 or it may push it into it and up for the hook 36 to engage the power line 38. A positive mechanical connection at this point is important in the testing procedure. The line 54 is then grounded to the ground by the stake 62 or preferably is connected to the ground wire 55 thus providing the best possible ground for the truck 10. During this time, the meter 40 has been shunted by the switch 46 being normally closed. Should there have been an excessive current through the fiberglass boom arm 16A and the bucket 18 the fuse 42 would have blown. However, should there be a substantially smaller amount of current flowing the meter 40 will so indicate when the cord 48 is pulled by the operator 50 thereby opening the switch 46 and permitting the current to flow through the meter 40. If the charge is great enough the meter hand 80 will register on the "no go" red color band 70, and conversely if the current is small or non-existent the meter hand will register on the "go" green band 72 indicating the absence of any foreign conductive material 50 in the bucket 18 and the boom arm 16A.

Once it has been established that the bucket 18 is safe for a person to work in, the boom is lowered and pole 26 is removed by operation of the clamp 24, but in any event a workman may then enter the bucket with assurance that he may safely work in the bucket near the high voltage power lines 38 and 52.

Some changes may be made in the construction and arrangement of my Electrical Current Intensity Detector without departing from the real spirit and purpose of my invention, and it is my intention to cover by my claims, any modified forms of structure or use of mechanical equivalents which may be reasonably included within their scope.

I claim:

1. A portable current intensity detector unit for aerial booms comprising:
    a boom supported on a conductive pedestal, said boom having an upper end formed of normally nonconductive material,
    a work station bucket means connected to the outer end of said boom upper end and having an open top side,
    said detector unit having an elongated body member and releasable connector means securing said body member in a position extending across the open top of said bucket,
    said body member having a portion extending outwardly of said bucket means and a probe means on an outer end thereof for detachable engagement with a high voltage power line,
    said body member having a conductive circuit means extending across said work station bucket means and connected to said probe means, and detachable conductive means included in said conductive circuit means in detachable engagement with portions of said bucket and said upper nonconductive boom end,
    a current intensity indicator carried on said elongated body member and included in said conductive circuit means,
    ground conductive means connecting said conductive pedestal to the ground, and
    said current intensity indicator being adapted to register the electrical conditions in said bucket by being energized by current flowing from a power line across said work station bucket means to the ground as capacitive current and current flowing to the ground through said boom and conductive pedestal.

2. The structure of claim 1 wherein said circuit includes a shunt circuit around said indicator, said shunt circuit includes a switch for opening and closing said shunt circuit.

3. The structure of claim 2 wherein said switch in said shunt circuit includes a cable means adapted to be operated from the ground when said work station bucket means is positioned substantially above the ground in the proximity of high voltage power lines.

4. The structure of claim 3 wherein said shunt circuit switch is normally closed and upon said switch being opened said circuit is through said indicator only.

5. The structure of claim 4 wherein said indicator includes a conspicuous indicator means for recognition from the ground to indicate whether said indicator is energized by said circuit being closed through said indicator.

6. The structure of claim 5 wherein said conspicuous indicator means is a color indicator wherein said indicator includes a dial hand movable across a two color background.

7. The structure of claim 6 wherein said circuit includes a fuse between said probe means and said indicator.

8. The structure of claim 3 wherein said conductive probe means includes a hook portion for mechanically engaging a power line to provide electrical connection therebetween.

9. The structure of claim 8 wherein said probe means is concave outwardly and said hook portion is on one end of said concave portion.

10. The structure of claim 3 wherein said ground in said circuit is the ground wire of the high voltage power lines.

11. The structure of claim 4 wherein said normally closed circuit switch is maintained closed by a spring means, and said cable means is formed from a nonconductive material.

References Cited

UNITED STATES PATENTS

| | | |
|---|---|---|
| 1,558,211 | 10/1925 | Williams. |
| 1,684,768 | 9/1928 | Iler. |
| 1,905,412 | 4/1933 | Kasson _____ 324—54 |
| 2,422,644 | 6/1947 | Martenet _____ 324—54 |
| 2,445,667 | 7/1948 | Fuglie. |
| 2,767,804 | 10/1956 | Foley. |
| 3,037,161 | 5/1962 | Cummings _____ 324—51 XR |
| 3,193,765 | 7/1965 | Bevins _____ 324—72.5 XR |
| 3,317,650 | 5/1967 | Padellford _____ 340—255 XR |
| 3,320,524 | 5/1967 | Miller _____ 324—54 |

GERARD R. STRECKER, Primary Examiner

U.S. Cl. X.R.

324—133; 340—255